(12) United States Patent
Bussmann

(10) Patent No.: US 8,333,640 B2
(45) Date of Patent: Dec. 18, 2012

(54) AXIAL SEPARATOR FOR A COMBINE HARVESTER HAVING ADJUSTABLE GUIDE ELEMENT

(75) Inventor: Jens Bussmann, Ostercappeln (DE)

(73) Assignee: CLAAS Selbetfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/036,696

(22) Filed: Feb. 28, 2011

(65) Prior Publication Data

US 2011/0223979 A1    Sep. 15, 2011

(30) Foreign Application Priority Data

Mar. 10, 2010   (DE) .......................... 10 2010 015 902

(51) Int. Cl.
*A01F 7/06*        (2006.01)
*A01F 12/44*       (2006.01)

(52) U.S. Cl. ....................................................... 460/80

(58) Field of Classification Search .................. 460/80, 460/68, 59, 62, 66, 71, 72, 79, 81, 107–110
See application file for complete search history.

(56) References Cited

U.S. PATENT DOCUMENTS

| | | | |
|---|---|---|---|
| 4,244,380 A * | 1/1981 | DePauw et al. | 460/108 |
| 4,258,726 A * | 3/1981 | Glaser et al. | 460/109 |
| RE31,257 E * | 5/1983 | Glaser et al. | 460/80 |
| 4,541,441 A * | 9/1985 | Ichikawa et al. | 460/66 |
| 5,913,724 A * | 6/1999 | Roberg | 460/83 |
| 6,152,820 A * | 11/2000 | Heidjann et al. | 460/112 |
| 6,241,605 B1 | 6/2001 | Pfeiffer et al. | |
| 6,860,805 B2 * | 3/2005 | Kuhn et al. | 460/111 |
| 7,156,732 B2 * | 1/2007 | Kuhn et al. | 460/111 |
| 7,632,181 B2 * | 12/2009 | Becker et al. | 460/66 |
| 7,682,236 B2 * | 3/2010 | Buermann et al. | 460/109 |
| 2009/0111547 A1* | 4/2009 | Pope et al. | 460/80 |
| 2010/0093413 A1* | 4/2010 | Pope et al. | 460/68 |

FOREIGN PATENT DOCUMENTS

EP    1 031 270    8/2000

* cited by examiner

*Primary Examiner* — Arpad Fabian-Kovacs
(74) *Attorney, Agent, or Firm* — Michael J. Striker

(57) ABSTRACT

An axial separator for a combine harvester has a separating rotor which is rotatably supported in a housing including, as viewed in the conveyance direction, a receiving region for crop material, a separating region, and a transfer region for crop material residue, a wall that limits the transfer region in sections and a guide element disposed in the transfer region. The guide element influences the flow of crop material residue conveyed from the transfer region to a further-handling unit and, is disposed on the housing such that its position is changeable in the circumferential direction.

8 Claims, 7 Drawing Sheets

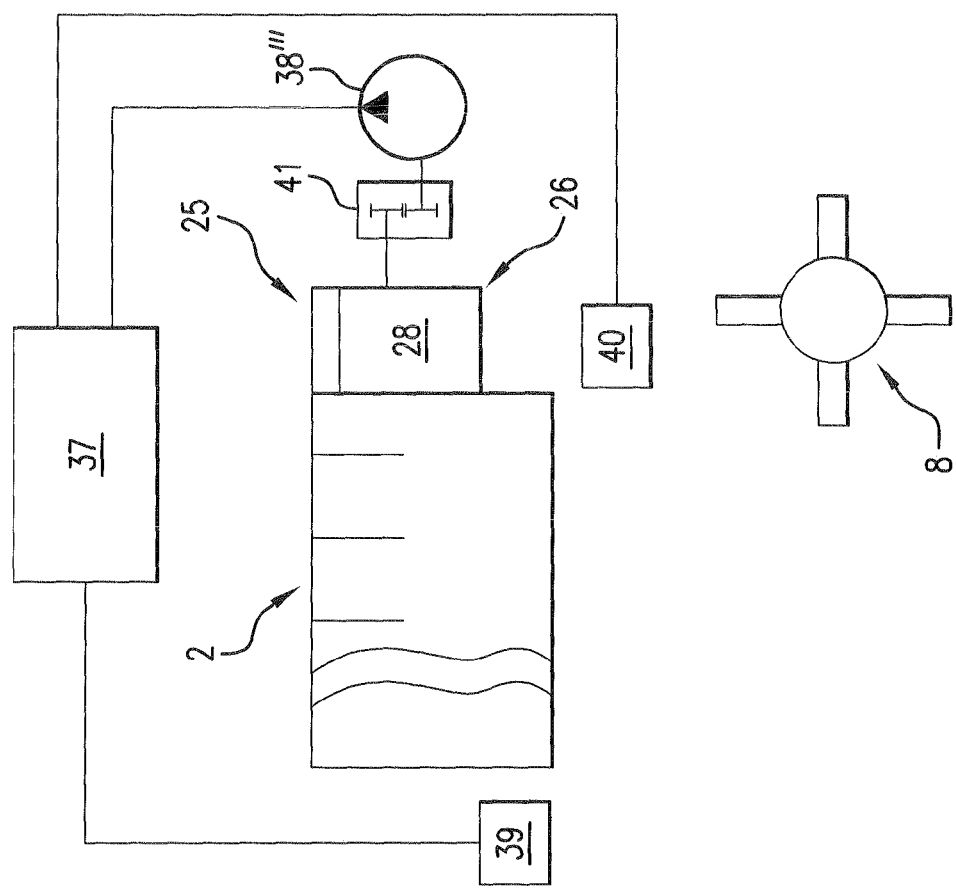

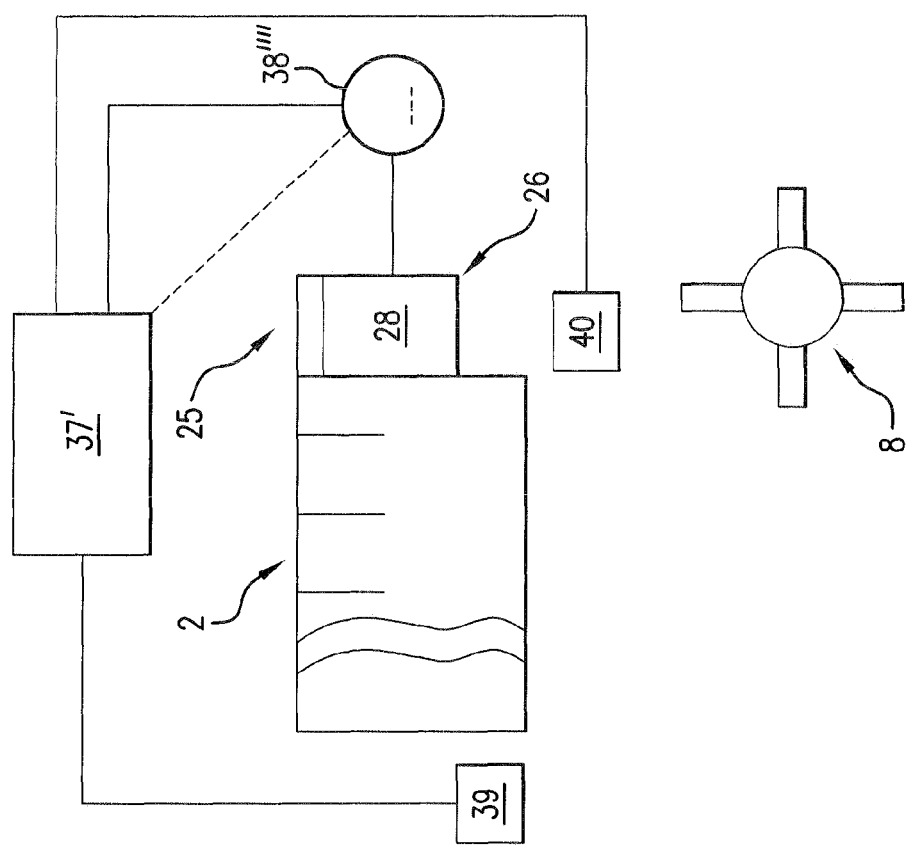

AXIAL SEPARATOR FOR A COMBINE HARVESTER HAVING ADJUSTABLE GUIDE ELEMENT

CROSS-REFERENCE TO RELATED APPLICATION

The invention described and claimed hereinbelow is also described in German Patent Application DE 10 2010 015 902.6 filed on Mar. 10, 2010. This German Patent Application, whose subject matter is incorporated here by reference, provides the basis for a claim of priority of invention under 35 U.S.C. 119(a)-(d).

BACKGROUND OF THE INVENTION

The present invention relates to an axial separator for a combine harvester, and to a control unit for an axial separator.

Axial separators for a combiner harvester comprise a separating rotor which is rotatably supported in a housing comprising, as viewed in the conveyance direction of the separating rotor, a receiving region for crop material, into which the crop material transferred by a threshing system upstream of the axial separator is delivered, a separating region, in which crop material is separated from non-crop components, and a transfer region for the crop material residue. For this purpose, the transfer region of the housing comprises an opening which is limited by a wall in sections in the circumferential direction of the separating rotor. Furthermore, a guide element is disposed in the transfer region in the region of the opening, which influences the flow of crop material emerging through the opening, and which is conveyed to a further-treatment device disposed underneath the transfer region.

Document EP 1 031 270 B1 makes known an axial separating device for an axial combine harvester, comprising a threshing-separating rotor which is rotatably supported in a housing, in which crop material is threshed and then separated from non-crop components. The non-crop components forming a stream of crop material are conveyed by the threshing-separating rotor into a transfer region, in which the stream of crop material is delivered to a distributor device located underneath the transfer region. A guide element which extends in the direction of rotation of the threshing-separating rotor and has a contour that varies in the direction of material flow is rigidly attached to the housing of the axial separating device in the transfer region of the housing enclosing the threshing-separating rotor, and deflects the crop material residue emerging from the transfer region.

A disadvantage of an axial separating device according to the prior art has proven to be that, due to the rigid arrangement of the guide element, the crop material cannot be specifically influenced in a satisfactory manner, in particular depending on the crop material properties. Especially when the crop material is moist, the rigid attachment of the guide element to the housing results in a unilateral distribution of the conveyance of the crop material residue into the downstream further-handling unit which cannot be compensated for by implementing a special shape of the rigidly disposed guide element, as provided according to the aforementioned prior art. A unilateral conveyance of the crop material residue into the further-handling unit eventually results in the crop material residue being distributed unevenly onto the field.

SUMMARY OF THE INVENTION

The problem addressed by the present invention is that of being able to specifically influence the conveyance of the crop material residue into the further-treatment device. A further problem addressed by the invention is that of providing a control unit which makes it possible to adjust the at least one guide element in a flexible manner in order to adapt the distribution on the field to different distribution conditions.

According to the present invention, the at least one guide element is disposed on the housing of the axial separator such that the position thereof can be changed in the circumferential direction of the housing of the axial separator. The changeability of the position of the at least one guide element makes it possible to specifically influence the ejection point of the crop material residue and the tear-off edge on the guide element when the stream of crop material residue is conveyed into a downstream further-handling unit. The opening width of the transfer region can be adapted in a flexible manner to various crop and/or working parameters, such as the type or moisture of the crop material and the desired distribution, in particular in respect to the layer thicknesses of the crop material residue to be placed on the field. A further advantage of the solution according to the invention is that the outlet width of the transfer region of the axial separator and the working width of the further-treatment device downstream of the axial separator, to which the flow of crop material residue is conveyed, can diverge. By way of the solution according to the invention, a working region of the further-handling unit, which is larger than the outlet width of the transfer region of the axial separator, can be supplied in a variable manner.

Preferably the guide element can be disposed, in sections, such that it extends in the direction of rotation of the separating rotor, on the side of the wall of the housing facing the separating rotor.

For this purpose, the guide element can open, partially or entirely, or entirely close a recess provided in the wall, which matches the contour of the guide element, depending on the position of the guide element relative to the wall.

According to an advantageous development, at least the region of the wall in the separating region, on which the guide element is disposed, can extend to the central plane of the separating rotor. Depending on the position of the at least one guide element relative to the wall, the flow of crop material residue is guided by the guide element for a shorter or longer period of time before it emerges from the opening in the separating region. The at least one guide element can be positionable such that it extends beyond the wall into the opening of the transfer region in sections.

In particular, the position of the guide element can be changed by way of manual actuation. For this purpose, the guide element can be guided on guide rails disposed parallel to the recess, and which extend substantially in the circumferential direction of the housing. Every guide rail can comprise at least two openings interspaced in the circumferential direction, through at least one of which a locking element extends and can be used to secure a position of the guide element, which has been selected manually relative to the wall, by way of a non-positive and/or form-fit connection. By way of this variant, an operator can specify the position of the at least one guide element by way of manual actuation, in order to influence the ejection of the crop material residue out of the axial separator. For this purpose, the openings can be designed as slots that permit stepless displacement of the guide element. As an alternative, a large number of interspaced holes can be provided which permit only a stepped displacement of the guide element.

According to an alternative embodiment, the position of the guide element can be changed by way of an electromechanical, hydraulic, or pneumatic actuator. For this purpose, the at least one guide element can be connected directly or indirectly to an actuator which can transfer the guide element into various positions relative to the wall and hold it the various positions. The actuator can be controllable for this purpose by a control unit provided in the cabin of the combine harvester, thereby relieving the operator during the harvesting operation.

The present invention furthermore relates to a control unit for an axial separator of a combine harvester, which comprises a separating rotor which is rotatably supported in a housing comprising, as viewed in the conveyance direction, a receiving region for crop material, a separating region, and a transfer region for crop material residue, a wall that limits the transfer region in sections in the circumferential direction of the separating rotor, and at least one guide element disposed in the transfer region, which influences the flow of crop material residue emerging from the transfer region and being conveyed to a further-handling unit located underneath the transfer region.

A further problem addressed by the invention is therefore that of providing a control unit that makes it possible to specifically adjust the at least one guide element for adaptation to different operating conditions, in order to distribute the crop material residue on the field in a nearly homogeneous layer thickness.

It is provided that the control unit is designed to control an actuator to change the position of the at least one guide element disposed concentrically to the longitudinal axis of the separating rotor depending on at least one crop material parameter and/or a working parameter. As a result, the position of the at least one guide element can be adjusted automatically, in order to influence the emergence of the flow of crop material residue.

For this purpose, the control unit can be connected to at least one sensor, which is designed to ascertain at least one crop material parameter and/or at least one working parameter of the combine harvester, and the control unit evaluates this at least one parameter and uses it to trigger the actuator to position the guide element depending on the existing harvesting conditions. The evaluation of at least one crop material parameter and/or at least one working parameter of the combine harvester makes it possible to continuously adapt the position of the at least one guide element to changing operating conditions that can be sensed, in order to obtain a homogeneous distribution of the flow of crop material residue on the ground by specifically influencing the conveyance of the flow of crop material residue into the further-handling unit.

Preferably the at least one sensor can be designed as a sensor for determining the moisture of the crop material before it enters the axial separator. Depending on the moisture content of the crop material residue, the actuator is triggered by the control unit to vary the position of the at least one guide element, thereby making it possible to prevent a unilateral supply of the further-handling unit caused by the crop material residue clumping in the separating rotor.

Furthermore, the at least one sensor can be designed as a sensor for determining the throughput of the crop material before it enters the axial separator.

Advantageously, the at least one sensor can be designed as a sensor for determining the spreading width of the flow of crop material residue after is emerges from the axial separator. Based on the knowledge of the distribution of the flow of crop material residue across the working width of the further-handling unit, the characteristic of the supply is changed by the actuator positioning the at least one guide element to obtain even distribution on the field that is adapted to the operating conditions.

The at least one sensor, which is provided to determine the spreading width of the crop material residue after it emerges from the axial separator, can be designed as an infrared sensor or an ultrasonic sensor. The use of a radar sensor is also feasible.

As an alternative or in addition thereto, at least one wind sensor that ascertains the wind direction and wind strength can be provided to determine the spreading width of the crop material residue after it emerges from the axial separator. For this purpose, the data collected by the wind sensor are supplied to the control unit and evaluated for use by the control unit as the basis for controlling the at least one guide element.

One development can be the use of an optical sensor in the form of a camera, thereby making it possible to perform an image or video evaluation of the spreading width of the flow of crop material residue. The optical sensor can be disposed upstream or downstream of the crop material further-handling unit. The image or video evaluation can be carried out by the control unit itself, or by a separate evaluation device which supplies the result to the control unit, to enable the at least one guide element to be controlled in an appropriate manner depending on the result of the image or video evaluation of the spreading width.

When more than one sensor is used to determine the spreading width, then in addition to the use of a single sensor type, a combination of the various sensor types can also be provided to ensure that the crop material residue is spread onto the field in an optimal manner.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 shows a schematicized representation of a control unit for an axial separator;

FIG. 4*c* shows a schematicized representation of an alternative embodiment of a control unit for an axial separator; and FIG. 4*d* shows a schematicized representation of an alternative embodiment of a control unit for an axial separator.

DESCRIPTION OF THE PREFERRED EMBODIMENTS

The description of the invention, which follows, relates to an embodiment of a combine harvester having a separating rotor, although it can be applied in an analogous manner to a combine harvester having more than one separating rotor.

Figure 1:
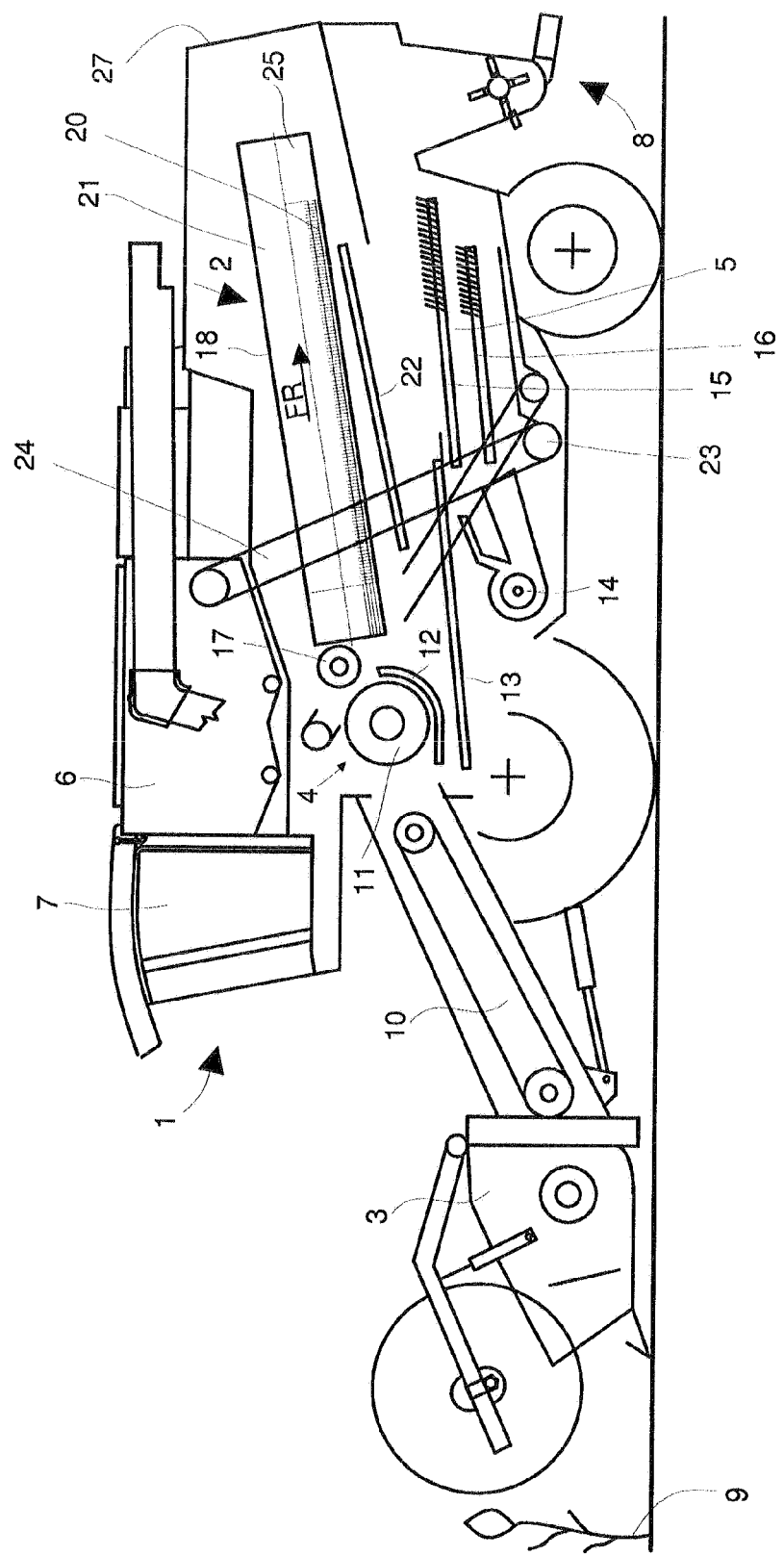
FIG. 1 shows a schematic longitudinal cross-sectional view of a combine harvester.

Combine harvester 1 depicted schematically in FIG. 1 and comprising an axial separator 2 is composed mainly of a header 3, a threshing unit 4, a cleaning unit 5, a grain tank 6, a driver's cab 7, and a further-handling unit 8 for the flow of crop material residue, which is disposed downstream of axial separator 2, and a straw chopper and/or a spreader unit disposed downstream of the straw chopper.

Crop material 9 cut by header 3 travels through feeder housing 10 to a thresher unit 4 operating according to the tangential principle. Thresher unit 4 is composed of a cylinder 11 and an assigned concave 12. The crop material components separated out on concave 12 are conveyed by way of a grain pan 13 to a cleaning unit 5 composed of a blower 14 and an upper and lower sieve 15, 16, respectively. The grain-short straw mixture that emerges from concave 12 in the tangential direction is conveyed into axial separator 2. The conveying process is supported by a rotating impeller 11 disposed parallel to cylinder 11.

Figure 2:
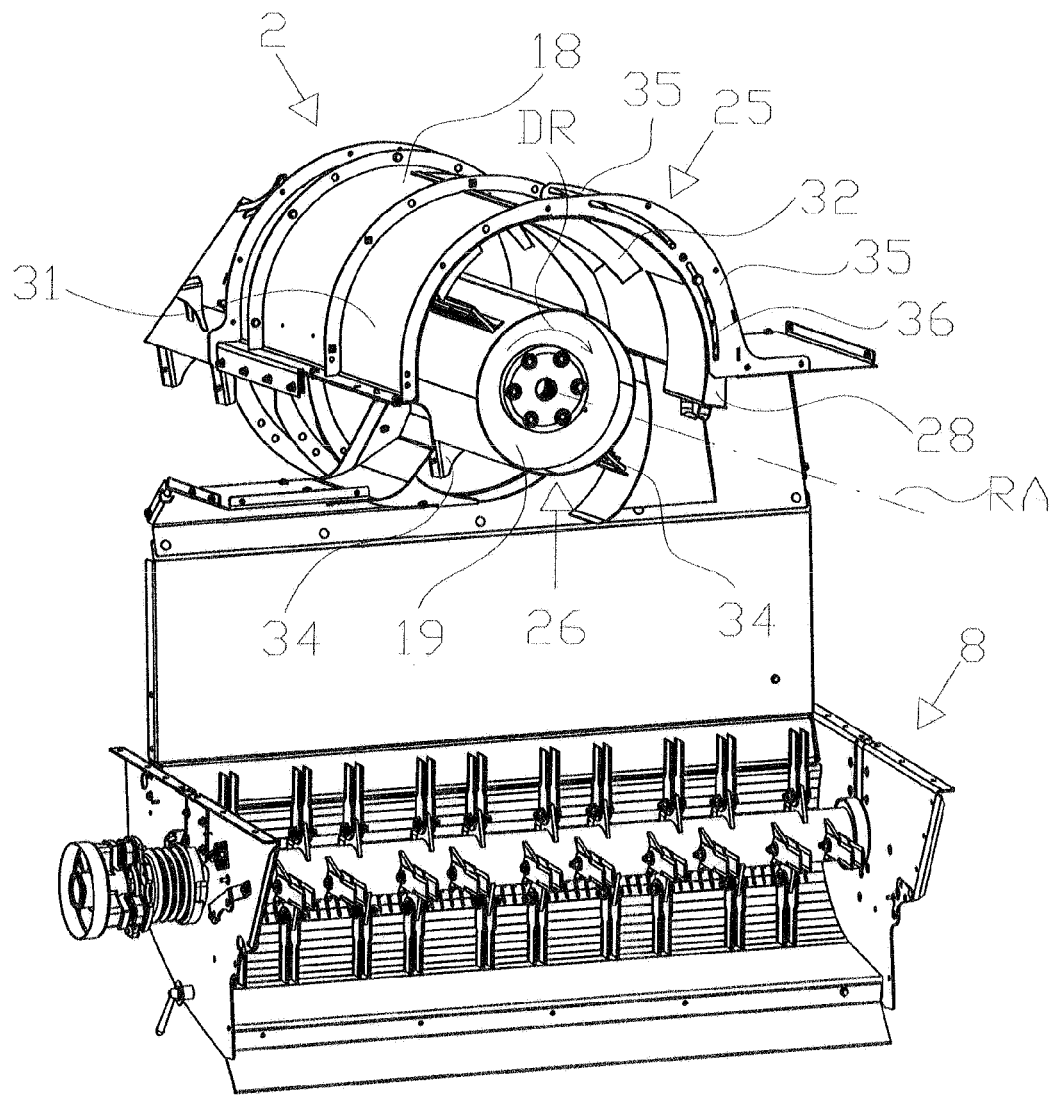
FIG. 2 shows a perspective partial view of a transfer region of an axial separator according to FIG. 1, comprising a guide element located in a first extreme position.
Figure 3:
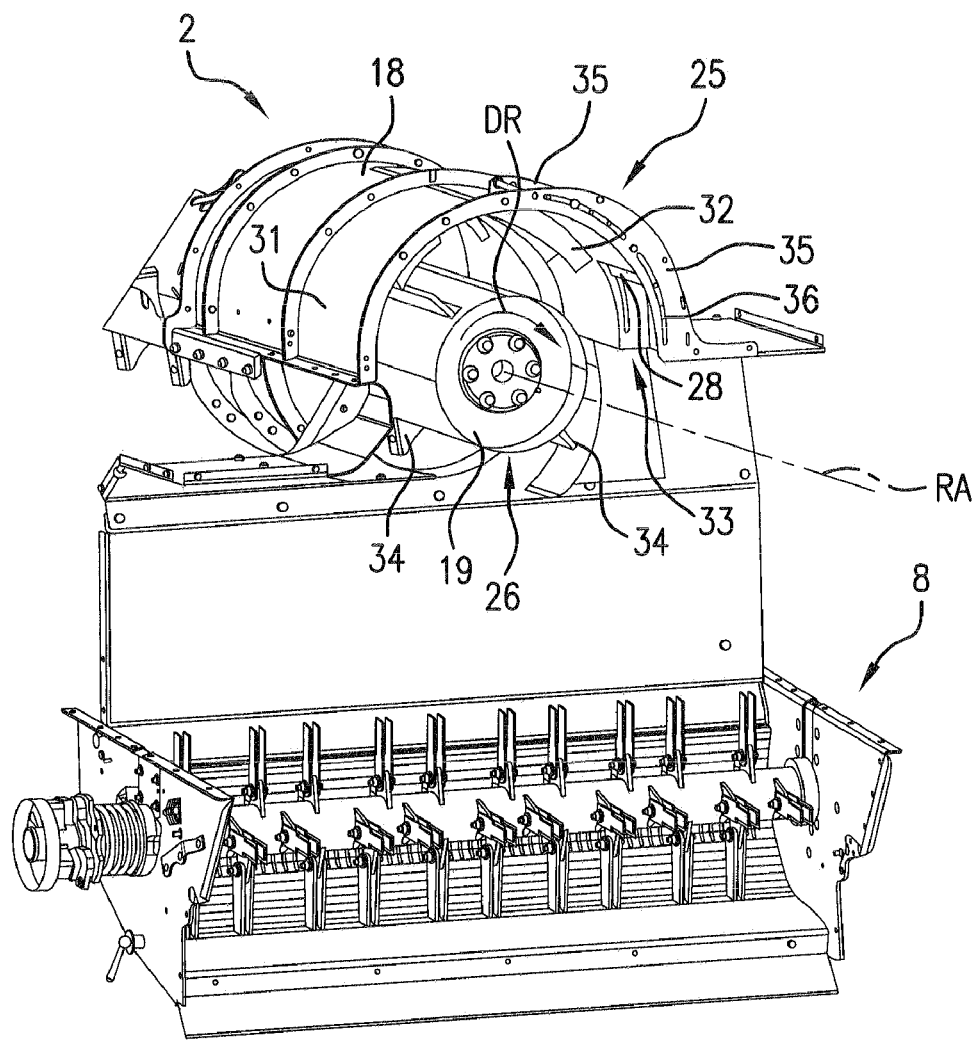
FIG. 3 shows a perspective partial view of a transfer region of an axial separator according to FIG. 1, comprising a guide element located in a second extreme position.

Axial separator 2 is situated in the longitudinal direction of combine harvester 1 and is composed mainly of a stationary, cylindrical housing 18 which rises in conveyance direction FR, and in which a rotatably drivable separating rotor 19 is supported. Housing 18 comprises a lower region having separating grates 20 and a closed upper cover region 21 having guide devices 32 disposed on the inner side as shown in FIGS. 2 and 3, to support the conveyance motion of the crop material. The circumferential region of separating rotor 19 is equipped with crop-material handling elements 34 having various designs, such as rails or paddles, which intensify the separating process.

The grains contained in the crop material mixture and portions of short straw and chaff are separated out on separating grates 20, and are conveyed to cleaning unit 5 by way of return pan 22 underneath. The cleaned grains travel by way of a conveyor auger 23 and an elevator 24 into grain tank 6. Inside axial separator 2 the straw and chaff forming the crop material residue are conveyed in the direction of transfer region 25 and, from there, having been distributed by way of an outlet width 26, reach further-handling unit 8 which is fastened transversely to the direction of travel to a frame underneath a straw outflow hood 27.

FIG. 2 shows a perspective partial view of transfer region 25 of axial separator 2 according to FIG. 1, comprising a guide element 28 located in a first extreme position. Transfer region 25 comprises a sectional opening in housing 18, which faces further-handling unit 8, extends concentrically to longitudinal axis RA of separating rotor 19, and out of which the flow of crop material residue emerges by way of changeable outlet width 26. The opening in transfer region 25 is limited in the radial direction by a wall 31 of housing 18. Housing 18 is equipped with radially inwardly extending, helically or spirally disposed guide units 32 on the inner side thereof facing separating rotor 19, which convey the crop material residue to be transported in axial separator 2 in conveyance direction FR to transfer region 25.

Housing 18 which encloses separating rotor 19 comprises in transfer region 25 at least one guide element 28, the position of which is changeable in the circumferential direction of housing 18. For this purpose, the at least one guide element 28 is disposed in sections in the rotation direction DR of separating rotor 19 extending on the side of wall 31 of housing 18 facing separating rotor 19. The at least one guide element 28 is preferably disposed on wall 31 of housing 18. For this purpose, at least one recess 33 is provided in wall 31, which matches the contour of guide element 28 and can be covered by at least one guide element 28. Recess 32 can be exposed, partially or entirely, or covered entirely depending on the position of guide element 28 relative to wall. The latter extreme position, in which recess 32 is covered entirely, is depicted in FIG. 2. According to an advantageous development of the invention, two or more position-changeable guide elements 28 can also be disposed in transfer region 25, next to one another in wall 31 of housing 18, it being possible to change the positions thereof independently of one another.

The at least one guide element 28 is guided e.g. on guide rails 35 disposed parallel to one another on the outer side of housing 18 facing away from separating rotor 19, between which guide element 28 is retained such that it is displaceable in the circumferential direction, and can be fixed in specifiable positions. For this purpose, guide rails 35, which are disposed perpendicularly to the surface of housing 18, comprise slots 36, for example, through which locking elements such as screws or the like extend, and which are used to secure guide element 28 in a manually selectable position. As an alternative, the position of the at least one guide element 28 can be changed by an actuator 38 which is connected to a control unit 37, as is explained further below.

FIG. 3 shows a perspective partial view of transfer region 25 of axial separator 2 according to FIG. 1, comprising a guide element 28 located in a second extreme position. In this second extreme position, the at least one recess 32 is fully exposed, and so the flow of crop material residue can emerge from transfer region 25 at least in portions at an earlier point in time and at an angle other than that in the first extreme position in which recess 32 is covered entirely, and can be conveyed to downstream further-handling unit 8.

As mentioned above, the position of the at least one guide element 28 relative to wall 31 is freely selectable, thereby making it possible to select different angles for the ejection of the flow of crop material residue and various positions of the tear-off edge of guide element 28. An arrangement of two or more guide elements 28 in one or more recesses 32 next to one another makes it possible, among other things, to stagger the ejection angle or the positions of the tear-off edge by positioning individual guide elements 28 differently relative to one another.

Figure 4A:
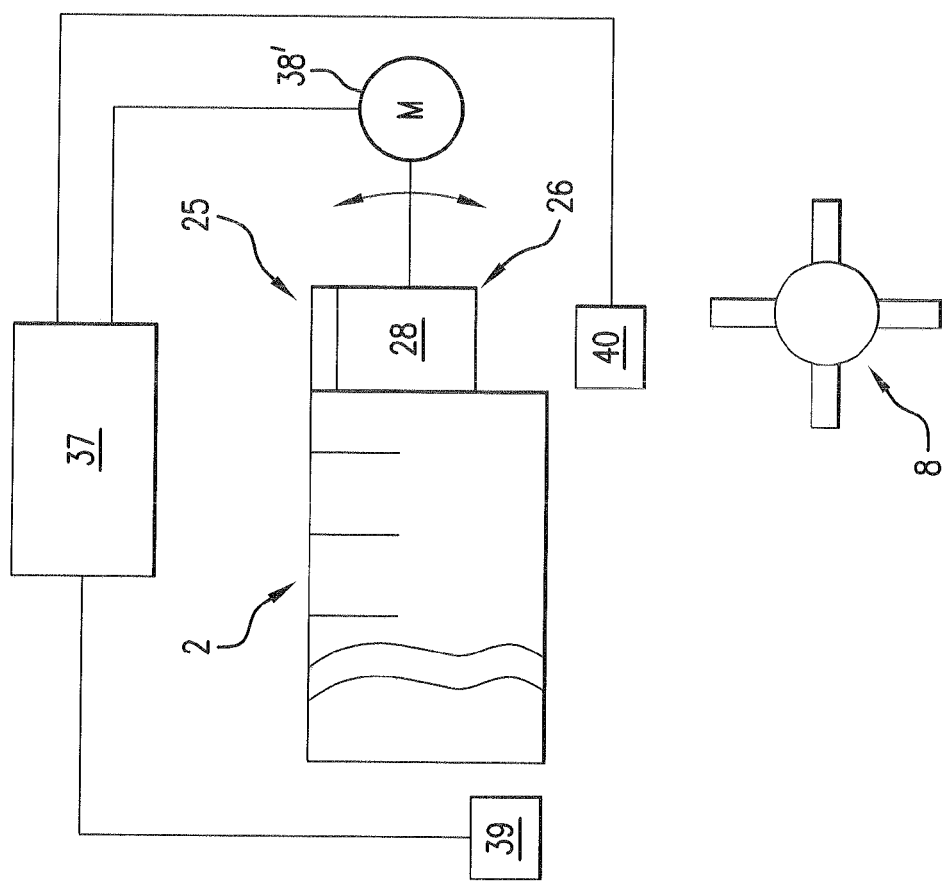
FIG. 4*a* shows a schematicized representation of an alternative embodiment of a control unit for an axial separator.
Figure 4B:
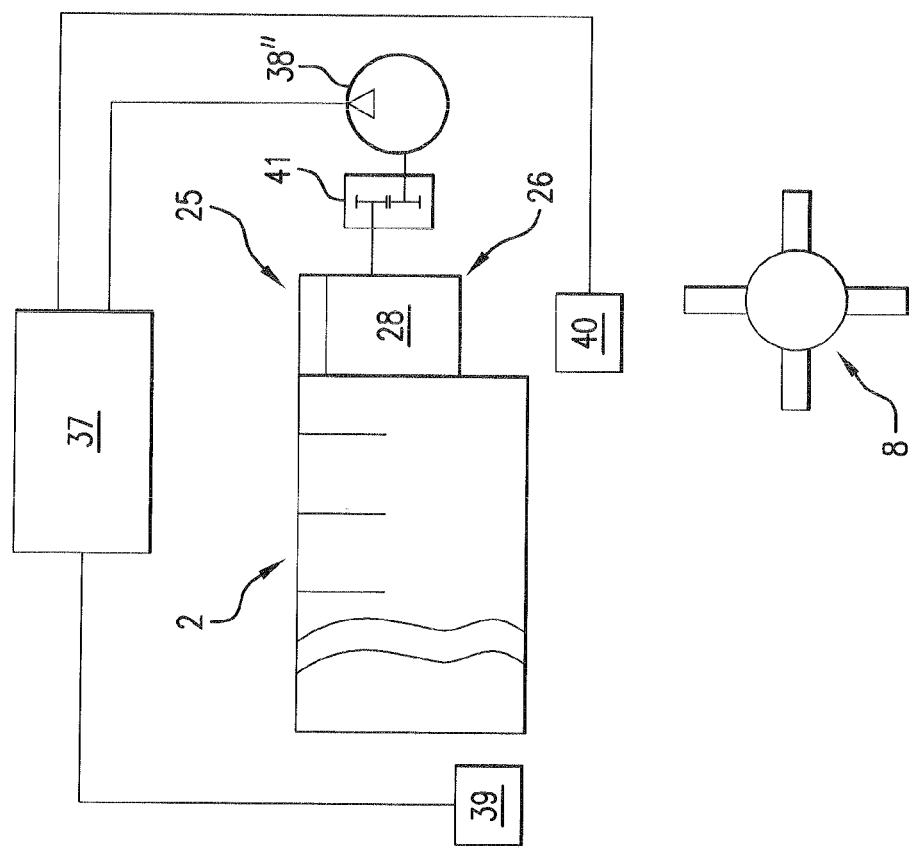
FIG. 4*b* shows a schematicized representation of an alternative embodiment of a control unit for an axial separator.

FIG. 4 shows a schematic depiction of a control unit 37 for an axial separator 2, which is designed to control an actuator 38 for changing the position of the at least one guide element 28, which is disposed concentrically to longitudinal axis RA of separating rotor 19, depending on at least one crop material parameter and/or at least one working parameter. For this purpose, control unit 37 can be designed as a separate device disposed on combine harvester 1, or can be integrated in a higher-order control unit of combine harvester 1. Control unit 37 is connected to actuator 38 by way of a communication means, such as a bus system, as shown in FIG. 4. Alternatively, a slightly modified embodiment of a control unit 37' including a wireless transmitter (not shown) may be wirelessly connected (see dashed line) to an actuator 38'''', which includes a wireless transmitter-receiver system as shown in FIG. 4d. In either case, the control unit (37, 37') controls, actuator (38, 38'''') such that the position of the at least one guide element 28 can be changed relative to wall 31. FIG. 4a depicts an actuator 38', which drives the at least one guide element 28 electromechanically (current induced). FIG. 4b depicts an actuator 38'', which drives the at least one guide element 28 hydraulically (by a hydraulic pump). FIG. 4c depicts an actuator 38''', which drives the at least one guide element 28 pneumatically (by a pneumatic pump). Please note that actuator 38, as shown in FIG. 4, is not meant to be limited to an electromechanically, hydraulically, or pneumatically actuatable actuator, but may embody any actuator known to the skilled artisan without deviating from the scope and spirit of the invention.

Furthermore, control unit 37 is connected by way of the communication means to at least one sensor 39, 40 which is designed to ascertain the at least one crop material parameter and/or working parameter of combine harvester 1. In the embodiment shown, sensor 39 is preferably designed as a sensor for determining the moisture of the crop material before it enters axial separator 2. As an alternative, sensor 39 can be designed as a sensor for determining the throughput of the crop material before it enters axial separator 2. Sensor 40 is designed as a sensor for ascertaining the spreading width of the flow of crop material residue after it emerges from axial separator 2 in transfer region 25. The parameter data ascertained by sensors 39, 40 are collected and evaluated by control unit 37 to adjust the position of the at least one guide element 28 depending on the currently detected, at least one crop material parameter and/or working parameter such that, in accordance with the given operating conditions such as travel across a flat field or along an incline, the crop material residue is distributed evenly on the field with an approximately homogeneous layer thickness.

The desired spreading width of crop material residue on the field corresponds approximately to the width of header 3 and takes place transversely to the longitudinal axis of combine harvester 1, in order to distribute crop material residue at every point on the harvested field. A specifiable distance from the edge of the stand is maintained during distribution on the field, to ensure that crop material residue is not carried by a crosswind or travel on an incline to the stand that has not yet been harvested. As a result, however, given an even supply across the supply width of further-handling unit 8, the layer thickness of the crop material residue on the ground is uneven since the spreading region between the longitudinal axis and the edge of the stand is narrower than the spreading region on the side of the longitudinal axis of combine harvester 1 facing away from the edge of the stand. This effect can be counteracted according to the invention by changing the position of at least one guide element 28 such that the quantity-related and spacial distribution is specifically adjusted during the supply of the crop material residue into further-handling unit 8, in order to obtain even layer thicknesses within the particular spreading regions regardless of the spreading width on the ground in the particular spreading region. For this purpose, actuator 38 is controlled by control unit 37 depending on the data collected by sensor 40 disposed behind axial separator 2, in order to change the position of the at least one guide element 28 accordingly.

The measurement of the moisture and/or throughput of crop material by sensor 39 before it enters axial separator 2 is used enable reaction to an expected clumping of the crop material residue if the moisture content is high or if supply into axial separator 2 is uneven, in order to prevent unilateral supply to further-handling unit 8, which would result in uneven distribution with an inhomogeneous layer thickness on the ground.

It will be understood that each of the elements described above, or two or more together, may also find a useful application in other types of constructions differing from the types described above.

While the invention has been illustrated and described as embodied in a axial separator for a combine harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. An axial separator for a combine harvester, comprising a housing;
a separating rotor having, as viewed in a conveyance direction, a receiving region for crop material, a separating region, and a transfer region for crop material residue, a wall limiting an opening in the transfer region in sections in a circumferential direction of the separating rotor; and
at least one guide element disposed in the transfer region, the at least one guide element influencing a flow of the crop material residue emerging in the transfer region and conveyed to a further-handling unit located underneath the transfer region;
wherein the at least one guide element is disposed on the housing such that its position is changeable in a circumferential direction of the housing; and
wherein a width in the opening of the transfer region is adapted in a flexible manner to various crop parameters, working parameters of both crop parameters and working parameters.

2. The axial separator as defined in claim 1, wherein the guide element is disposed in sections in a rotational direction of the separating rotor extending on a side of the wall of the housing facing the separating rotor.

3. The axial separator as defined in claim 1, wherein the guide element partially or entirely exposes, or entirely covers a recess provided in the wall and matching a contour of the guide element depending on a position of the guide element relative to the wall.

4. The axial separator as defined in claim 2, wherein the guide element is displaceable relative to the wall.

5. The axial separator as defined in claim 1, wherein at least a region of the wall in the transfer region on which the guide element is disposed extends in a central plane of the separating rotor.

6. The axial separator as defined in claim 1, wherein the guide element has a position which is changeable by a manual actuation.

7. The axial separator as defined in claim 1, wherein the guide element has a position which is changeable by an electromechanical actuator.

8. The axial separator as defined in claim 1, wherein the guide element has a position which is changeable by an actuator selected from the group consisting of a hydraulic actuator and a pneumatic actuator.

* * * * *